United States Patent
Bencheikh (10) Patent No.: US 10,045,282 B2
(45) Date of Patent: Aug. 7, 2018

(54) SYSTEM AND METHOD FOR OPTIMIZING SCANNING FROM A MULTI-BAND COMMUNICATIONS DEVICE

(75) Inventor: Ahmed Bencheikh, Fairfax Station, VA (US)

(73) Assignee: Time Warner Cable Enterprises LLC, St. Louis, MO (US)

(*) Notice: Subject to any disclaimer, the term of this patent is extended or adjusted under 35 U.S.C. 154(b) by 183 days.

(21) Appl. No.: 12/972,914

(22) Filed: Dec. 20, 2010

(65) Prior Publication Data

US 2012/0155385 A1    Jun. 21, 2012

(51) Int. Cl.
| | | |
|---|---|---|
| *H04W 48/16* | (2009.01) | |
| *H04W 48/12* | (2009.01) | |
| *H04W 36/00* | (2009.01) | |
| *H04W 88/06* | (2009.01) | |
| *H04W 4/02*  | (2018.01) | |
| H04W 36/32   | (2009.01) | |

(52) U.S. Cl.
CPC ....... *H04W 48/16* (2013.01); *H04W 36/0083* (2013.01); *H04W 88/06* (2013.01); *H04W 4/02* (2013.01); *H04W 36/32* (2013.01); *H04W 48/12* (2013.01)

(58) Field of Classification Search
USPC ......... 370/330–338, 328, 329, 343, 400–405
See application file for complete search history.

(56) References Cited

U.S. PATENT DOCUMENTS

| | | | | |
|---|---|---|---|---|
| 6,002,918 | A  * | 12/1999 | Heiman et al. | 340/7.38 |
| 7,680,469 | B2 * | 3/2010  | Fry | 455/127.1 |
| 7,970,414 | B1 * | 6/2011  | Werden et al. | 455/456.1 |
| 2005/0197156 | A1 * | 9/2005 | Fourquin et al. | 455/553.1 |
| 2006/0104200 | A1 | 5/2006 | Park | |
| 2007/0189325 | A1 * | 8/2007 | Hoffmann | H04B 7/088 370/464 |
| 2008/0009278 | A1 * | 1/2008 | Jung | 455/422.1 |
| 2008/0009307 | A1 | 1/2008 | Sekhar et al. | |
| 2008/0198811 | A1 * | 8/2008 | Deshpande et al. | 370/332 |
| 2008/0227463 | A1 * | 9/2008 | Hizume et al. | 455/456.1 |
| 2008/0316985 | A1 * | 12/2008 | Kostic et al. | 370/338 |
| 2009/0005005 | A1 * | 1/2009 | Forstall et al. | 455/411 |
| 2010/0054179 | A1 * | 3/2010 | Meyer | 370/328 |
| 2010/0124213 | A1 | 5/2010 | Ise et al. | |

(Continued)

OTHER PUBLICATIONS

International Search Report and Written Opinion issued in PCT Application No. PCT/US2011/065855, dated Aug. 31, 2012.

(Continued)

*Primary Examiner* — Ayaz Sheikh
*Assistant Examiner* — Mariela Vidal Carpio
(74) *Attorney, Agent, or Firm* — Chapin IP Law, LLC (57) ABSTRACT

Systems and methods for optimizing scanning from a multi-band communications device. A multi-band communications device scans for identifiers from one or more base stations. The multi-band communications device determines whether the received base station identifiers are associated with an access point (AP) on a list of APs. The multi-band communications device connects to the AP when the received base station identifiers are associated with the AP. The terms "base station" and "access point" encompass transmit and receive sites that provide communications using various technologies that may include Wi-Fi and cellular.

11 Claims, 5 Drawing Sheets

(56) References Cited

U.S. PATENT DOCUMENTS

| | | | |
|---|---|---|---|
| 2010/0136947 A1* | 6/2010 | Yoo et al. ................... | 455/404.2 |
| 2010/0265885 A1* | 10/2010 | Umeuchi .............. | H04W 48/16 |
| | | | 370/328 |
| 2011/0003590 A1* | 1/2011 | Yoon ................... | H04W 36/385 |
| | | | 455/432.1 |
| 2011/0028085 A1* | 2/2011 | Waung et al. ..................... | 455/7 |
| 2011/0103318 A1* | 5/2011 | Ekici et al. ................... | 370/329 |
| 2011/0205946 A1* | 8/2011 | Avital et al. .................. | 370/311 |
| 2011/0216692 A1* | 9/2011 | Lundsgaard .......... | H04W 48/20 |
| | | | 370/328 |
| 2011/0263274 A1* | 10/2011 | Fox ....................... | H04W 60/00 |
| | | | 455/456.2 |
| 2011/0286437 A1* | 11/2011 | Austin .................... | H04W 4/02 |
| | | | 370/338 |
| 2012/0033653 A1* | 2/2012 | Kalbag ................... | H04W 4/20 |
| | | | 370/338 |
| 2012/0135728 A1* | 5/2012 | Karpoor ................ | H04W 48/16 |
| | | | 455/432.1 |
| 2014/0031036 A1* | 1/2014 | Koo et al. ..................... | 455/434 |

OTHER PUBLICATIONS

International Preliminary Report on Patentability (Chapter 1 of the Patent Cooperation Treaty) issued in PCT Application No. PCT/US2011/065855 dated Jul. 4, 2013.

\* cited by examiner

SYSTEM AND METHOD FOR OPTIMIZING SCANNING FROM A MULTI-BAND COMMUNICATIONS DEVICE

BACKGROUND

Wireless communication services are being provided over an ever expanding number of protocols and technologies. The various technologies provide choices to users in terms of costs and features that can be leveraged to suit the users' needs at particular points in time.

For example, high speed data (HSD) service providers typically offer subscribers a gateway device that provides wired connectivity to a fiber, coax or mobile medium and a Wi-Fi access point (AP) for connectivity within the home or business. When the Wi-Fi device moves out of range of one AP, it may send out probes to locate other APs that may be within range.

Multi-band communications devices, such as smart phones, typically include a wireless carrier transceiver for communicating over a first wireless network and a second transceiver for communicating over a second wireless network. Currently, the second wireless network is typically a Wi-Fi network that utilizes a system of APs. However, other multi-band arrangements are possible.

In some multi-band mobile devices, the second transceiver, such as a Wi-Fi transceiver, may be turned on (or placed in an idle mode) by the user. For example, when a Wi-Fi transceiver is on, the multi-band mobile device actively scans for APs and may associate with an AP (providing that the multi-band mobile device can provide the authentication information when required by the AP). However, in an environment in which APs are numerous, or in a situation where the multi-band mobile device is moving in and out of range of a number of APs, the Wi-Fi transceiver may be constantly scanning for Wi-Fi APs. Under these conditions, the Wi-Fi transceiver may consume a significant portion of the energy stored in the batteries of the multi-band mobile device.

One approach to saving battery life is to turn the second transceiver off. However, using this alternative precludes the use of channels accessible to the second transceiver as an alternative path for communications that by default will be provided over the wireless carrier transceiver.

SUMMARY

Embodiments herein are directed to systems and methods for optimizing the scanning activities of a multi-band communications device. In an embodiment, the communications device receives a list of access points (APs). Each AP on the list is associated with one or more wireless carrier base stations. The communications device scans for base station signals using a first circuit (for example, a first receiver or a transceiver) of the communications device and determines whether the received base station signals are associated with an AP on the list of APs. The communications device scans and connects to the AP when an attribute of the received base station (for example, signal strength, base station identifier, or location) is associated with the AP on the list of APs using a second circuit (for example, a second receiver or a transceiver) of the communications device.

In another embodiment, when the multi-band communications device detects that it is in proximity to the base stations associated with a favorite AP, the multi-band communications device turns the second circuit on and permits scanning. When the multi-band communications device detects that it is not in range of the base stations associated with a favorite AP, the multi-band communications device turns the second circuit off or switches it to an idle mode, thereby reducing demand on the battery that powers the multi-band communications device.

In another embodiment, the second circuit is a Wi-Fi transceiver and the APs are Wi-Fi APs.

In another embodiment, the user configures the multi-band communications device to create favorites lists of base stations and APs. In another embodiment, the configuration of the multi-band communications device is performed by a cellular service provider, by the operator of the APs, or by a third party. In yet another embodiment, the multi-band communications device populates the favorites list with base station identifiers associated with a particular AP and stores them in memory.

DETAILED DESCRIPTION

As used herein, the term "base station" refers to a device or system of devices that communicates with a first circuit (for example, a first receiver or a transceiver) in a multi-band communications device. The term "access point" or "AP" encompasses a device or system of devices that communicates with a second circuit (for example, a second receiver or a transceiver) in a multi-band communications device. A Wi-Fi AP provides a point of connection for Wi-Fi devices such as laptop computers, notebook computers, PDAs, VoIP phones and dual network (cellular plus Wi-Fi) phones.

To illustrate the various embodiments herein, a multi-band communications device having a cellular transceiver and a Wi-Fi transceiver is described. However, the use of such a multi-band communications device is not meant as a limitation. A multi-band communications device may have any number of circuits (for example, receivers and/or transceivers) that are capable of establishing communications over multiple networks that utilize the same or different protocols. In addition, the circuits may be implemented as discrete structures or may be implemented as a single structure that is configurable to operate as a plurality of transceivers. Further, the multi-band features of a multi-band communications device may be implemented in hardware and/or software.

As used in the exemplary embodiments set forth below, the term "authentication" encompasses passing authentication credentials to a Wi-Fi access point that identifies a user of a Wi-Fi device as authorized to access the Wi-Fi AP. For example, the authentication credentials may include the MAC address of the Wi-Fi device and the SSID of the subscriber's network. An AP and a Wi-Fi device authenticate via authentication request frames sent by the Wi-Fi device and authentication response frames sent by the AP in response to the request. If a Wi-Fi device and an AP are configured to use a shared key, the exchange of authorization frames will include the Wi-Fi device using the shared key to encrypt challenge text. The AP will use the same key to decrypt the challenge text to verify that the Wi-Fi device has possession of the correct key.

As used herein, the term "association" encompasses a process by which an AP and a Wi-Fi device establish a link for sending and receiving data. The term "reassociation" encompasses a process by which a Wi-Fi device that is associated with an AP seeks to associate with a different AP. The association (or reassociation) of a Wi-Fi device and an AP may be initiated by a Wi-Fi device sending an association request frame (or, if appropriate, a reassociation request frame) that may include the MAC address and supported data rates of the Wi-Fi device and if, appropriate the security credentials required by the AP. The access point may respond by sending a response frame containing an association ID along with other information regarding the access point.

As used herein, the term "security credentials" encompasses a subscriber's security protocol (for example, Wired Equivalent Privacy or WEP, and Wi-Fi Protected Access or WPA) and a security key consistent with the protocol used.

As used herein, the term "idle mode" encompasses a state of receiver or transceiver of a multi-band communications device in which power may be applied to the receiver or transceiver of the multi-band communications device but the receiver or transceiver is not performing one or more if its functions that consume power.

Figure 1:
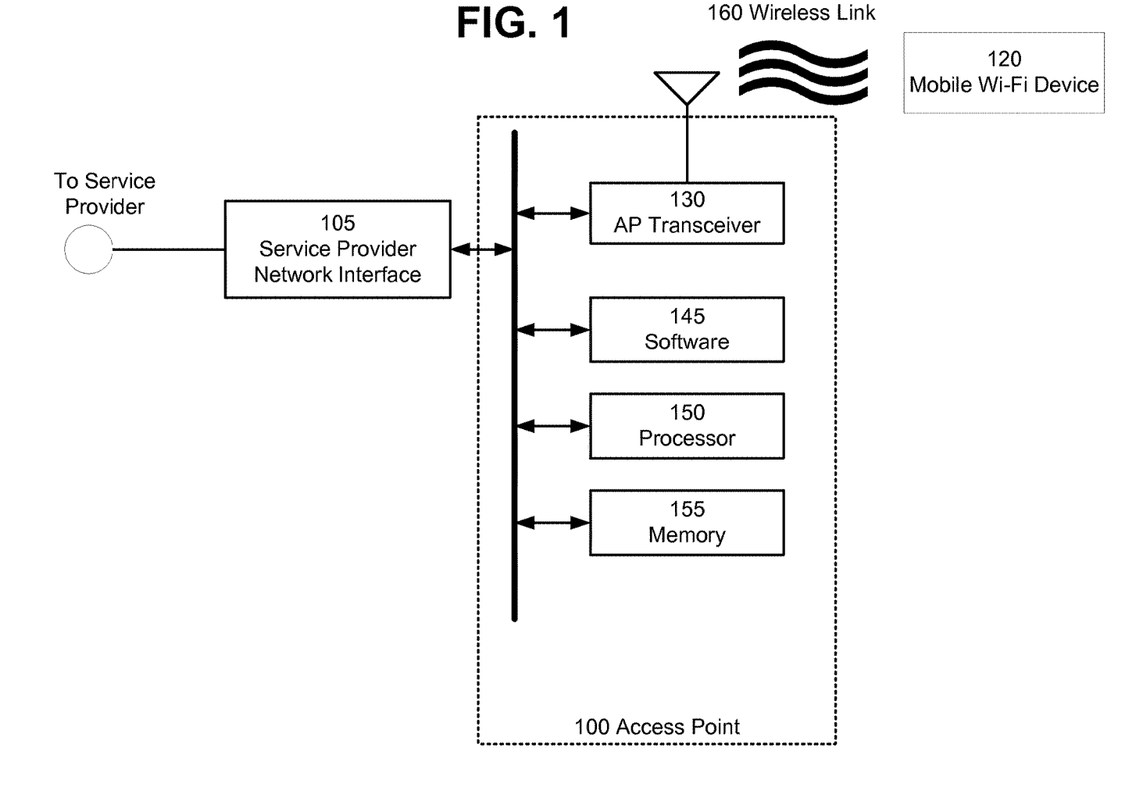
FIG. 1 is a block diagram illustrating elements of an access point.

FIG. 1 is a block diagram illustrating a configuration of an access point.

An access point (AP) 100 comprises a service provider network interface 105 that connects an HSD service provider network to wireless devices, such as multi-band communications device 120, through one or more AP transceivers 130. The AP transceiver 130 transmits and receives data over a wireless link 160 to and from wireless devices. In an embodiment, the wireless link 160 may be an 802.11x compliant link (sometimes referred to herein as a "Wi-Fi" link).

The interface 105 and selected functions of AP transceiver 130 may be implemented in hardware, firmware or software. Other functions of transceiver 130 may be implemented in RF (Radio Frequency) circuitry as will be understood by one skilled in the art.

In an embodiment, the AP transceiver 130 modulates the data to produce an RF signal of the wireless link 160. In an embodiment of the present invention, the AP transceiver 130 transmits at one of a plurality of power levels, as determined by a power management application implemented by the software 145. By way of illustration and not by way of limitation, the transmit power of the AP transceiver 130 may be increased when the home gateway 100 is providing services to roaming Wi-Fi devices as further described below. In another embodiment, the transmit power is limited according to applicable laws of the jurisdiction in which the home gateway 100 is operated.

AP transceiver 130 is further operable to receive signals from a Wi-Fi device over wireless link 160. In this instance, the transceiver 130 receives an RF signal and demodulates the RF signal to obtain a base-band signal to recapture a packet of data.

The software 145 also permits a subscriber to register with a designated SSID and security credentials in association with a Wi-Fi device's unique MAC address.

Internet access has advanced from the early dialup system to take advantage of improving wired and wireless technologies. High capacity data networks are currently offered over cable, fiber connections, and wireless networks. For example, cellular systems operate 3G and 4G networks that utilize new and efficient protocols, such as Worldwide Interoperability for Microwave Access (WiMAX) and Long-Term Evolution (LTE) among others to provide increased bandwidth and coverage.

Figure 2:
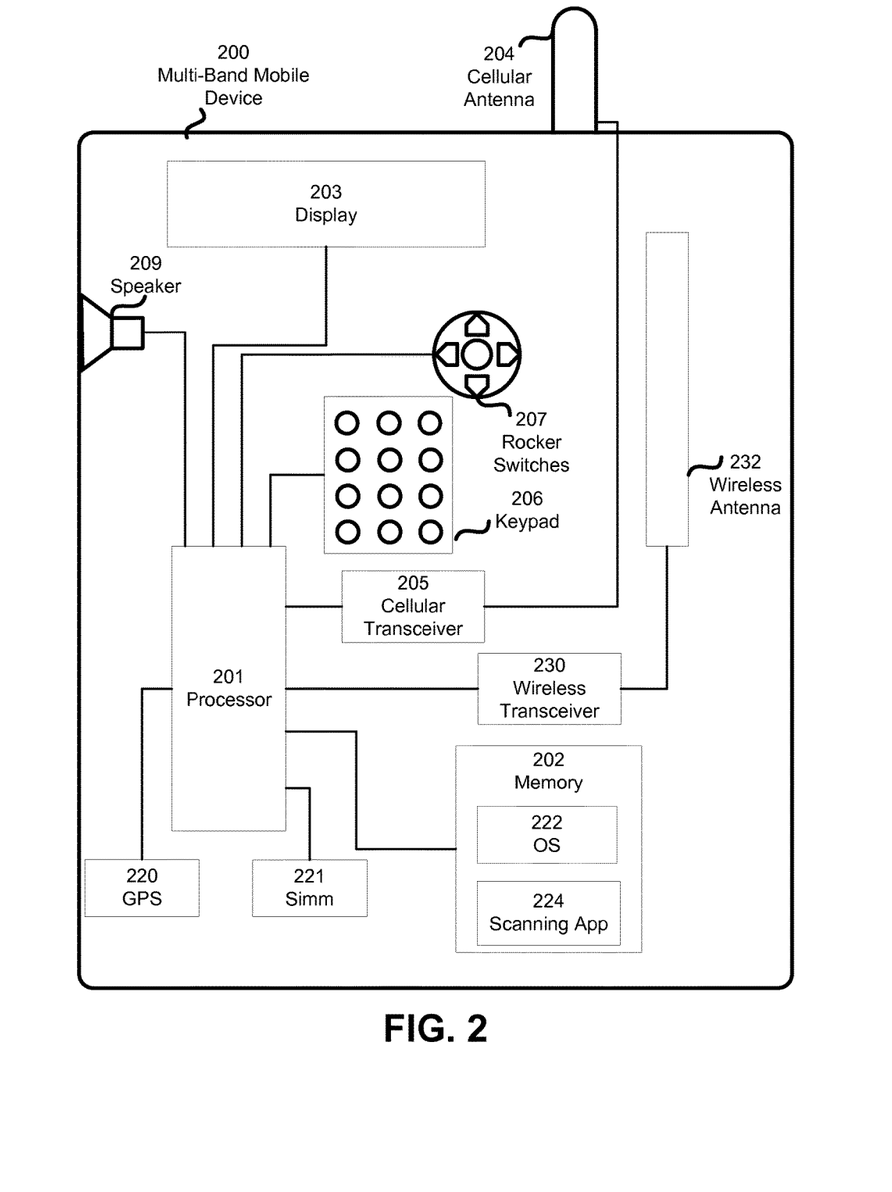
FIG. 2 is a block diagram illustrating a multi-band communications device according to an embodiment.

FIG. 2 is a block diagram illustrating a multi-band communications device according to an embodiment.

A multi-band communications device 200 may include a processor 201 coupled to an internal memory 202, to a display 203 and to a SIM 221 or similar removable memory unit. Additionally, the computing device 200 may have a cellular antenna 204 for sending and receiving electromagnetic radiation that is connected to a cellular transceiver 205 coupled to the processor 201. In some implementations, the transceiver 205 and portions of the processor 201 and memory 202 may be used for multi-network communications. The multi-band communications device 200 may also include a key pad 206 or miniature keyboard and menu selection buttons or rocker switches 207 for receiving user inputs. The multi-band communications device 200 may also include a GPS navigation device 220 coupled to the processor and used to determine the location coordinates of the multi-band communications device 200. Additionally, the display 203 may be a touch-sensitive device that may be configured to receive user inputs.

A wireless transceiver 230 provides wireless communications via wireless antenna 232. By way of illustration and not by way of limitation, the wireless transceiver may be compliant with 802.11x standards.

The processor 201 may be any programmable microprocessor, microcomputer or multiple processor chip or chips that can be configured by software instructions (applications) to perform a variety of functions, including the functions of the various embodiments described herein. In an embodiment, the multi-band communications device 200 may include multiple processors 201, such as one processor dedicated to cellular and/or wireless communication functions and one processor dedicated to running other applications.

Typically, software applications may be stored in the internal memory 202 before they are accessed and loaded into the processor 201. In an embodiment, the processor 201 may include or have access to an internal memory 202 sufficient to store the application software instructions. The memory may also include an operating system 222.

In an embodiment, the wireless transceiver 230 is responsive to software commands. In this embodiment, the wireless transceiver 230 may be turned on or off or placed in an idle mode, either by direct commands from a user of the multi-band communications device 200 or in response to commands issued by an application, such as scanning application 224. In another embodiment, the cellular transceiver 205 is responsive to software commands. In this embodiment, the cellular transceiver 205 may be turned on or off or placed in an idle mode, either by direct commands from a user of the multi-band communications device 200 or in response to commands issued by an application, such as scanning application 224.

The internal memory of the processor may include a secure memory (not illustrated) which is not directly accessible by users or applications and that is capable of recording MDINs and SIM IDs as described in the various embodiments. As part of the processor, such a secure memory may not be replaced or accessed without damaging or replacing the processor.

Additionally, the internal memory 202 may be a volatile or nonvolatile memory, such as flash memory, or a mixture of both. For the purposes of this description, a general reference to memory refers to all memory accessible by the processor 201, including internal memory 202, removable memory plugged into the computing device, and memory within the processor 201 itself, including the secure memory.

In an embodiment, additional memory chips (e.g., a Secure Data (SD) card) may be plugged into the multi-band communications device 200 and coupled to the processor 201.

Figure 3:
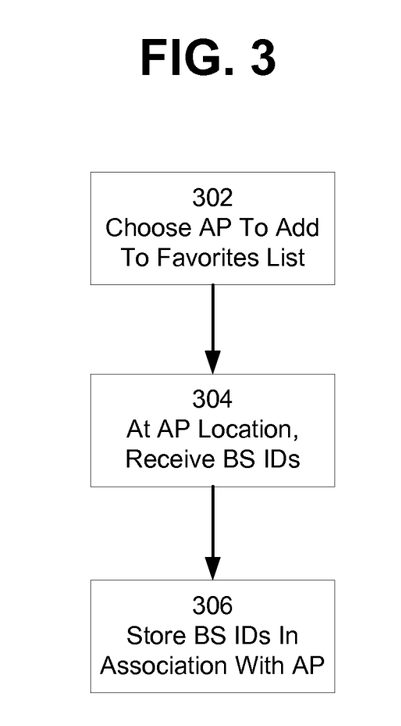
FIG. 3 is a process flow diagram illustrating the operation of a multi-band communications device to obtain location information of a selected access point according to an embodiment.

FIG. 3 is a process flow diagram illustrating the operation of a multi-band communications device to obtain location information of a selected access point according to an embodiment.

In an embodiment, the configuration of the scanning application 224 is accessible to the user of the multi-band communications device 200. A user of a multi-band communications device 200 selects an AP to add to a favorites list (block 302). In an embodiment, the favorites list is maintained in a memory 202 of the multi-band communications device 200. At the AP location, the multi-band communications device 200 receives base station identifiers of base stations located proximate to the AP location (block 304) via cellular transceiver 205. The base station identifiers may be stored in association with the selected AP (block 306). Collectively, the base station identifiers may be referred to herein as AP location information. The identification of a selected AP may be SSID or by a name assigned to it by the user of the multi-band communications device 200.

As previously noted, the scanning application 224 may also be configured by a service provider or a third party. In this embodiment, a multi-band communications device provides location information of the multi-band communications device to a datastore via a network. The datastore provides a list of APs based on the location information of the communications device. Each of the listed APs is associated with one or more base stations proximate to the AP. The datastore may be operated by a third party, as for example, a provider of cellular services and/or Wi-Fi services.

In another embodiment, the multi-band communications device discovers and populates its internal database or a network database with the list of APs and base station identifiers (for example, BSID for Base Station ID or Preamble). For example, while connected to a Wi-Fi AP, the multi-band communications device may listen to the neighboring base stations, log their identifiers and associate them with Wi-Fi APs that are within range of the device. Optionally, the user of the multi-band communications device may be asked whether to save the association of the discovered AP and the base station identifiers. If the associations are saved (either automatically or by assent of the user), subsequently the multi-band communications device will only look for an AP that is in an area covered by a base station whose identifier is associated with that AP.

In an embodiment, a measure of signal strength of each base station for which a base station identifier is received is also stored in association with the AP identifying information and the base station identifier and, when so stored, becomes an element of the AP location information.

Figure 4:
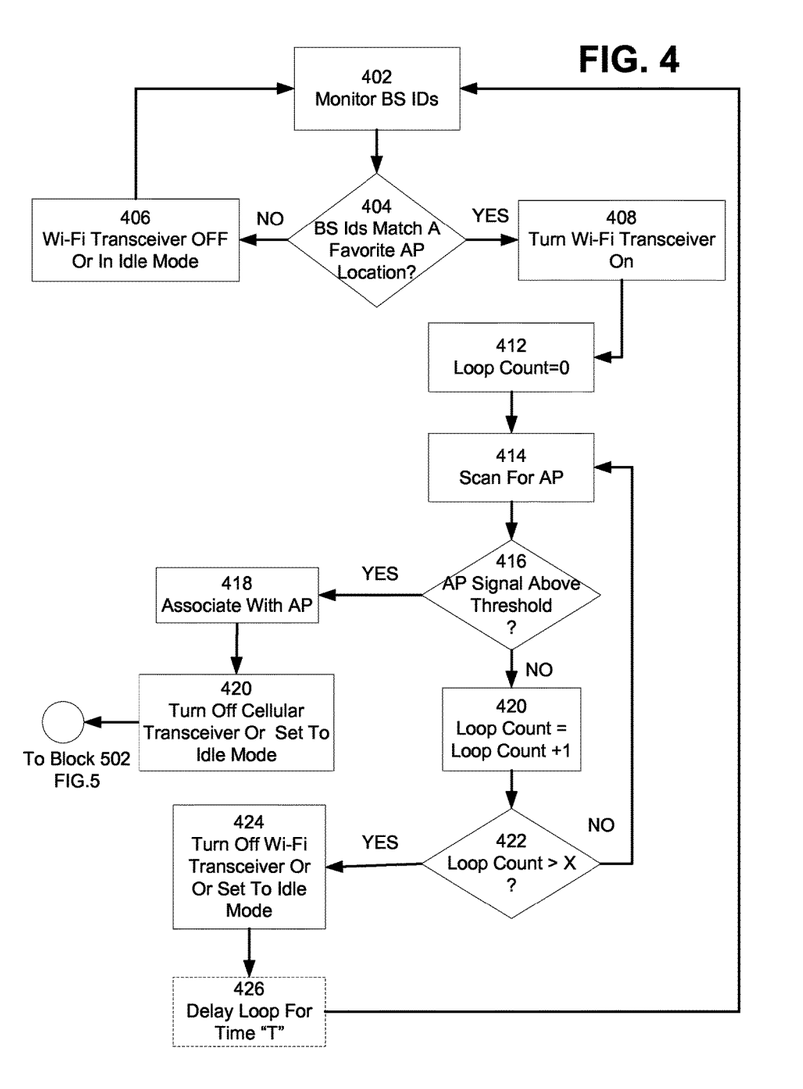
FIGS. 4 and 5 are process flow diagrams illustrating the operation of a multi-band communications device utilizing AP location information to control a Wi-Fi transceiver in a multi-band communications device according to an embodiment.
Figure 5:
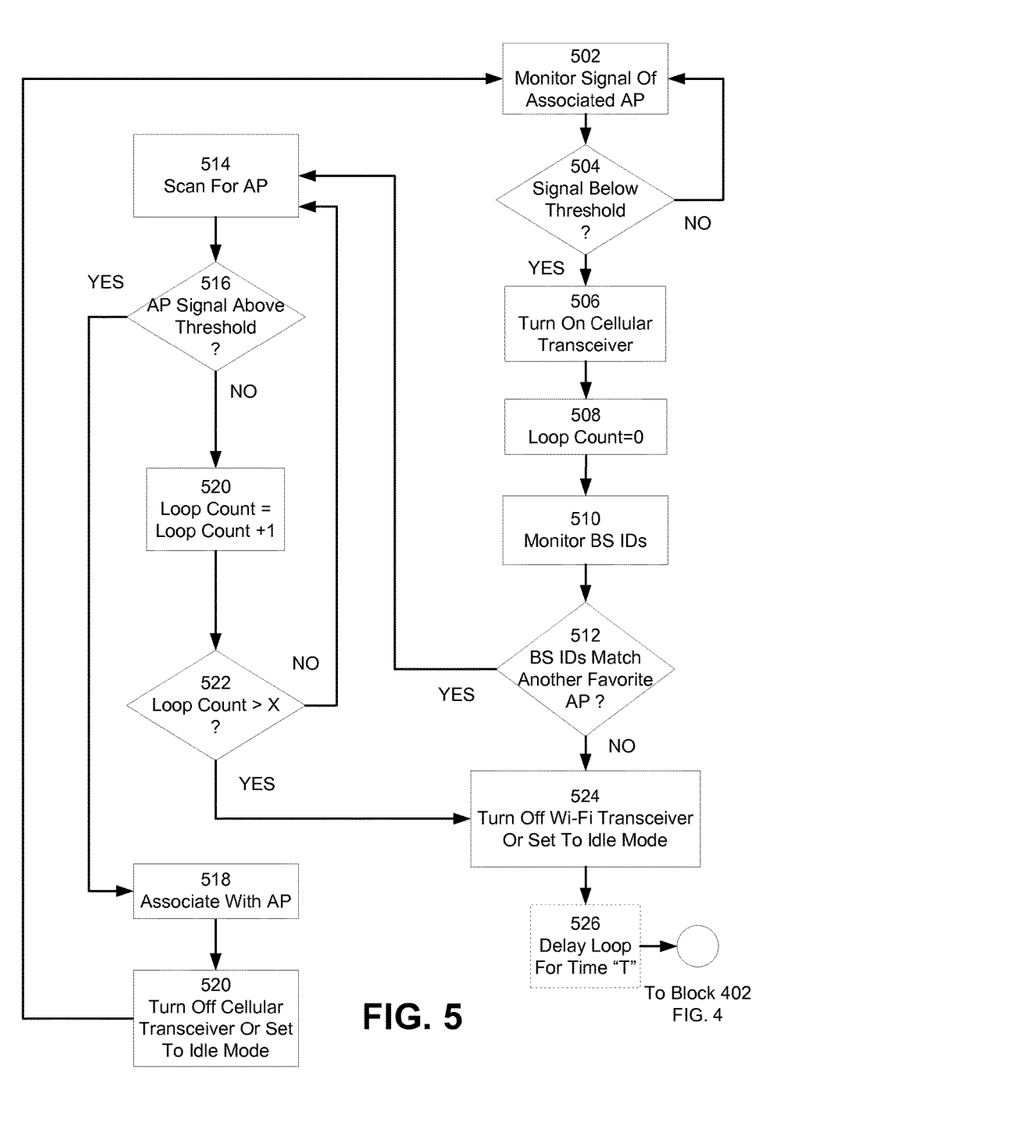

FIGS. 4 and 5 are process flow diagrams illustrating the operation of a multi-band communications device utilizing AP location information to control a Wi-Fi transceiver in a multi-band communications device according to an embodiment.

In the process illustrated in FIG. 4, the Wi-Fi transceiver (FIG. 2, 230) is initially in the "OFF" or idle mode and the cellular transceiver (FIG. 2, 205) is in the "ON" mode.

In an embodiment, a processor (FIG. 2, 201) of the multi-band communications device (FIG. 2, 200) executes instructions that cause it to monitor the base station identifiers received by the wireless transceiver (FIG. 2, 230) at a point in time (block 402). A determination is made whether the received base station identifiers match the base station identifiers associated with an AP stored in memory (FIG. 2, 202) (block 404).

If the received base station identifiers do not match the base station identifiers associated with an AP (that is, the result of block 404 is "No"), the Wi-Fi receiver remains in off or idle mode (block 406) and the process returns to monitoring base station identifiers (block 402). If the received base station identifiers match the base station identifiers associated with an AP (that is, the result of block 404 is "Yes"), the Wi-Fi transceiver is instructed to enter the "ON" mode (block 408). A loop count is initialized to zero (block 412). The Wi-Fi transceiver scans for an AP on the list of favorite APs (block 414). A determination is made whether an AP signal is above a threshold (block 416). If no AP signal above the threshold is detected (that is, the result of block 416 is "NO"), the loop count is incremented by one (block 420). A determination is made whether the loop count exceeds a pre-selected number (block 422). If the loop count does not exceed a pre-selected number (that is, the result of block 416 is "NO"), the process returns to scanning for APs (block 414). If the loop count exceeds a pre-selected number (that is, the result of block 416 is "YES"), the Wi-Fi receiver is turned off or placed in an idle mode (block 424). The process may return to block 402 to scan for base station IDs or, optionally may enter a delay loop (block 426) before returning to block 402. The optional delay loop permits a multi-band communications device that is moving to scan for base station IDs at a different physical location so as to potentially identify different base stations and to obtain a different list of associated APs.

Returning to block 416, if an AP signal is detected (that is, the result of block 416 is "YES"), the Wi-Fi transceiver associates with one of the APs on the AP list (block 418). The selection of the AP may be made based on criteria that are provided to the scanning application (FIG. 2, 224). For example, if the signals of two or more APs are above the threshold, the AP with the highest signal level may be selected or the AP may be selected based on a position in the list of associated APs or based on its SSID or other criteria.

When the Wi-Fi transceiver associates with one of the APs on the AP list, the cellular transceiver is then turned off or placed in an idle mode 420. The process then moves to block 502 of FIG. 5.

In the process illustrated in FIG. 5, the Wi-Fi transceiver (FIG. 2, 230) is initially in the "ON" mode and the cellular transceiver (FIG. 2, 205) is in the "OFF" or idle mode. The Wi-Fi transceiver in the multi-band communications device monitors the AP signal (block 502). The Wi-Fi transceiver in the multi-band communications device determines whether the AP signal is below a threshold (block 504). If the AP signal is not below a threshold, (that is, the result of block 504 is "No"), the monitoring of the AP signal continues (block 502).

If the AP signal is below a threshold, (that is, the result of block 504 is "Yes"), the cellular transceiver is turned on (block 506). A loop count is initialized at zero (block 508). A processor (FIG. 2, 201) of the multi-band communications device (FIG. 2, 200) executes instructions that cause it to monitor the base station identifiers received by the wireless transceiver (FIG. 2, 230) at a point in time (block 510). A determination is made whether the received base station identifiers match the base station identifiers associated with an AP stored in memory (FIG. 2, 202) (block 512).

If the received base station identifiers do not match the base station identifiers associated with an AP (that is, the result of block 512 is "No"), the Wi-Fi transceiver is instructed to enter the "OFF" or idle mode (block 524). The process may return to block 402 to scan for base station IDs or, optionally may enter a delay loop (block 526) before returning to block 402. The optional delay loop permits a multi-band communications device that is moving to scan for base station IDs at a different physical location so as to potentially identify different base stations and to obtain a different list of associated APs.

Returning to block 512, if the received base station identifiers match the base station identifiers associated with an AP (that is, the result of block 512 is "Yes"), the Wi-Fi transceiver may then scan for an AP on the list of favorite APs (block 514). A determination is made whether an AP signal is above a threshold (block 516). If no AP signal above the threshold is detected (that is, the result of block 516 is "NO"), the loop count is incremented by one (block 520). A determination is made whether the loop count exceeds a pre-selected number (block 522). If the loop count does not exceed a pre-selected number (that is, the result of block 522 is "NO"), the process returns to scanning for APs (block 514). If the loop count exceeds a pre-selected number (that is, the result of block 516 is "YES"), the Wi-Fi receiver is turned off or placed in an idle mode (block 524). The process may return to block 402 to scan for base station IDs or, optionally may enter a delay loop (block 526) before returning to block 402. The optional delay loop permits a multi-band communications device that is moving to scan for base station IDs at a different physical location so as to potentially identify different base stations and to obtain a different list of associated APs.

Returning to block 516, if an AP signal is detected (that is, the result of block 516 is "YES"), the Wi-Fi transceiver associates with one of the APs on the AP list (block 518). The selection of the AP may be made based on criteria that are provided to the scanning application (FIG. 2, 224). For example, if the signals of two or more APs are above the threshold, the AP with the highest signal level may be selected or the AP may be selected based on a position in the list of associated APs, SSID or other criteria.

When the Wi-Fi transceiver associates with one of the APs on the AP list, the cellular transceiver is then turned off or placed in an idle mode 520. The process then moves to block 502 of FIG. 5.

In an embodiment, a measure of signal strength of each base station for which a base station identifier is received is also stored in association with the AP identifying information and the base station identifier and, when so stored, becomes an element of the AP location information.

In this embodiment, the processor (FIG. 2, 201) utilizes the signal strength measures in making a determination whether the received base station identifiers match the base station identifiers associated with an AP stored in memory (FIG. 2, 202) (blocks 404 and 512). In order for a match to be deemed to have occurred (that is, the results of blocks 404 and 512 to be "Yes"), the received signal strengths of each of the base stations for which a base station identifier is received must also be within a threshold value of the signal strength values stored in memory (FIG. 2, 202).

In another embodiment, the processor (FIG. 2, 201) monitors the signal strengths of the base stations for which a base station identifier is stored in memory. A change in the received signal strengths of these base stations is measured over time to determine when a multi-band communications device (FIG. 2, 200) is approaching an AP on the favorites list. In this embodiment, the processor (FIG. 2, 201) may issue an alert (for example a tone or electronic voice message) indicating the proximity of a favorite AP.

The foregoing method descriptions and the process flow diagrams are provided merely as illustrative examples and are not intended to require or imply that the steps of the various embodiments must be performed in the order presented. As will be appreciated by one of skill in the art, the order of steps in the foregoing embodiments may be performed in any order. Further, words such as "thereafter," "then," "next," etc. are not intended to limit the order of the steps; these words are simply used to guide the reader through the description of the methods.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an," or "the," is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Functionality of various logical blocks may be performed by other logical blocks or circuits. Additionally, functionality of various logical blocks may be performed by additional logical blocks or circuits that are not separately illustrated.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The blocks of a method or algorithm disclosed herein may be embodied in a processor-executable software module, which may reside on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the following claims and the principles and novel features disclosed herein.

What is claimed is:

1. A method comprising:
receiving a favorites list at a communications device, the favorites list including a list of favored access points (APs), the favored APs being associated with specified network entities, respectively, the specified network entities including one or more specified base stations, the communications device including at least a first circuit and a second circuit, the first circuit having an associated first transceiver, the second circuit having an associated second transceiver, and the communications device being powered by a battery;
activating the first circuit included in the communications device, the first circuit for use by the communications device to wirelessly communicate with one or more first network entities in a first communications network, the one or more first network entities including one or more base stations;
in a first deactivating step, deactivating the second circuit included in the communications device in order to place the second circuit in a deactivated state, the deactivating of the second circuit including turning the second transceiver off or placing the second circuit in an idle mode, the second circuit for use by the communications device to communicate with one or more second network entities in a second communications network, the one or more second network entities including one or more specified APs;
receiving a first wireless signal at the communications device, the first wireless signal being received via the first circuit in the communications device, the first wireless signal being received from a respective first network entity in the first communications network, the first wireless signal including a first identifier of the respective first network entity in the first communications network, the respective first network entity in the first communications network being associated with a respective specified AP in the second communications network;
activating the second circuit in the communications device in order to transition the second circuit from the deactivated state to an activated state, the activating of the second circuit being based on: i) the first identifier included in the first wireless signal matching a base station identifier of a respective specified base station that is associated with a respective favored AP in the favorites list, and ii) a signal strength of receiving a communication from the respective specified base station, the first network entity being the respective specified base station;
subsequent to activating the second circuit, performing a loop, the loop conditionally performed until a number of iterations of performing the loop exceeds a predetermined number of iterations, wherein the predetermined number is greater than one, and wherein the second circuit is turned off in response to the condition in which the number of iterations of performing the loop is greater than the predetermined number, the loop including:
while performing the loop, prior to exceeding the predetermined number of iterations, receiving at least two second wireless signals from at least two APs from the list of favored APs via the second circuit,
determining whether the second wireless signals are above a threshold, and
in response to determining that the second wireless signals are not above the threshold, increase the number of iterations of performing the loop and continue to receive at least two second wireless signals from the list of favored APs;
in response to determining that the second wireless signals from the at least two APs are above the threshold, establishing a link for sending and receiving data between the communications device and one of the at least two APs from the list of APs, wherein the one of the at least two APs is selected based on a position in the list of APs; and in a second deactivating step, having established the link between the communications device and selected AP, deactivating the first circuit, thereby reducing power demand on the battery.

2. The method of claim 1, wherein the first communications network is a cellular communications network, and wherein the first circuit includes the first transceiver for communicating on the cellular communications network.

3. The method of claim 1, wherein the second communications network is a WiFi communications network, and wherein the second circuit includes the second transceiver for communicating on the WiFi communications network.

4. The method of claim 1, wherein performing the loop includes:
maintaining an indication of the number of iterations that the loop has been performed.

5. The method of claim 4, wherein the maintaining of the indication comprises:
incrementing a counter each time the loop is performed.

6. The method of claim 1, further comprising:
receiving, via the first circuit, a second identifier of another first network entity in the first communications network; and
storing the second identifier of the other first network entity in the communications device in association with the respective favored AP.

7. A communications device comprising:
a first circuit having an associated first transceiver, and;
a second circuit having an associated second transceiver; and circuitry for:
receiving a favorites list at the communications device, the favorites list including a list of favored access points (APs), the favored APs being associated with specified network entities, respectively, the specified network entities including one or more specified base stations, and the communications device being powered by a battery;
activating the first circuit included in the communications device, the first circuit for use by the communications device to wirelessly communicate with one or more first network entities in a first communications network, the one or more first network entities including one or more base stations;
in a first deactivating step, deactivating the second circuit included in the communications device in order to place the second circuit in a deactivated state, the deactivating of the second circuit including turning the second transceiver off or placing the second circuit in an idle mode, the second circuit for use by the communications device to communicate with one or more second network entities in a second communications network, the one or more second network entities including one or more specified APs;
receiving a first wireless signal at the communications device, the first wireless signal being received via the first circuit in the communications device, the first wireless signal being received from a respective first network entity in the first communications network, the first wireless signal including a first identifier of the respective first network entity in the first communications network, the respective first network entity in the first communications network being associated with a respective specified AP in the second communications network;
activating the second circuit in the communications device in order to transition the second circuit from the deactivated state to an activated state, the activating of the second circuit being based on: i) the first identifier included in the first wireless signal matching a base station identifier of a respective specified base station that is associated with a respective favored AP in the favorites list, and ii) a signal strength of receiving a communication from the respective specified base station, the first network entity being the respective specified base station;
subsequent to activating the second circuit, performing a loop, the loop conditionally performed until a number of iterations of performing the loop exceeds a predetermined number of iterations, wherein the predetermined number is greater than one, and wherein the second circuit is turned off in response to the condition in which the number of iterations of performing the loop is greater than the predetermined number, the loop including:
while performing the loop, prior to exceeding the predetermined number of iterations, receiving at least two second wireless signals from at least two APs from the list of favored APs via the second circuit,
determining whether the second wireless signals are above a threshold, and
in response to determining that the second wireless signals are not above the threshold, increase the number of iterations of performing the loop and continue to receive at least two second wireless signals from the list of favored APs;
in response to determining that the second wireless signals from the at least two APs are above the threshold, establishing a link for sending and receiving data between the communications device and one of the at least two APs from the list of APs, wherein the one of the at least two APs is selected based on a position in the list of APs; and
in a second deactivating step, having established the link between the communications device and selected AP, deactivating the first circuit, thereby reducing power demand on the battery.

8. The apparatus of claim 7, further comprising circuitry for:
maintaining an indication of the number of iterations the loop has been performed.

9. The apparatus of claim 7, further comprising circuitry for:
incrementing a counter each time the loop has been performed, the counter indicating the number of iterations of performing the loop.

10. The apparatus of claim 7, wherein the second deactivating step includes turning the first transceiver associated with the first circuit off or placing the first circuit in an idle mode.

11. The apparatus of claim 7, further comprising:
circuitry for:
receiving, via the first circuit, a second identifier of another first network entity in the first communications network; and
storing the second identifier of the other first network entity in the apparatus in association with the respective favored AP.

* * * * *